UNITED STATES PATENT OFFICE.

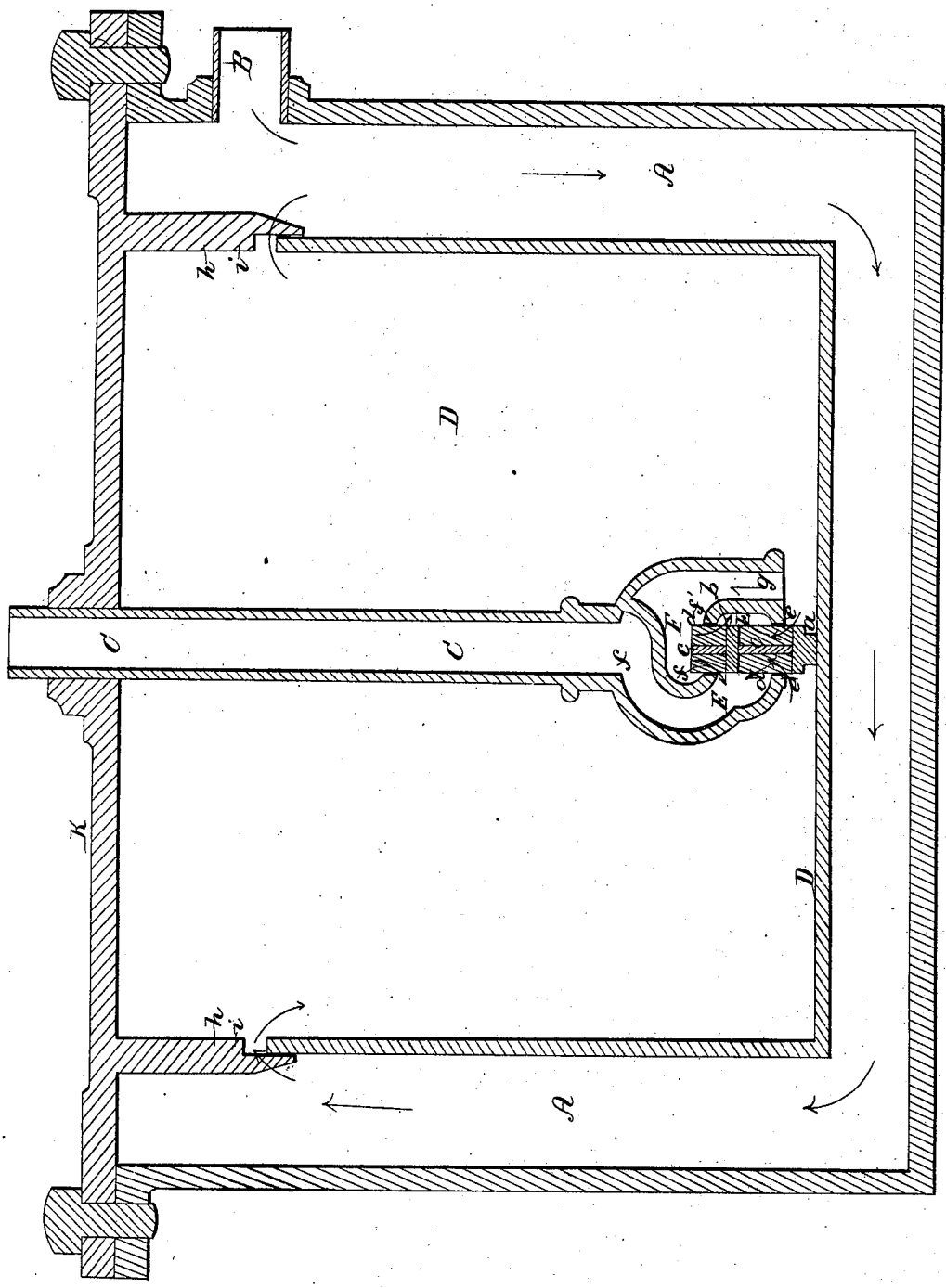
C. C. Walworth,
Steam Trap,
Nº 10,416.
Patented Jan. 10, 1854.

CALEB C. WALWORTH, OF BOSTON, MASSACHUSETTS.

FLOAT-VALVE FOR DISCHARGING CONDENSED WATER.

Specification of Letters Patent No. 10,416, dated January 10, 1854.

*To all whom it may concern:*

Be it known that I, CALEB C. WALWORTH, of Boston, in the county of Suffolk and State of Massachusetts, have invented a new and useful or Improved Apparatus to be Used for Discharging Condensed Water from Steam Pipes or Vessels; and I do hereby declare that the same is fully described and represented in the following specification and the accompanying drawings, letters, figures, and references thereof.

In the employment of long lines of pipes for the conveyance of steam whether for heating buildings or otherwise, it often becomes desirable to remove from them the water produced by condensation of the steam and this without loss of the uncondensed steam.

To accomplish this, is the object of my apparatus, of which the drawings herewith presented exhibits a vertical and central section.

In the said drawings, A, exhibits a closed cylinder or other proper shaped vessel, having an inlet pipe, B, opening into it and an outlet pipe, C, extending into and from it. The pipe, B, is for the passage of steam and condensed water into the vessel and connects with the steam exhaust pipe or vessel from which the water of condensation is to be abstracted.

Within the vessel, A, is a vessel, D, made open at top, and so as to be capable of floating in water contained in the vessel A, when in use. Attached to the middle of the bottom of the vessel, D, and extending above it is a cylindrical valve, $a$, which is connected to another and similar valve, $b$, by crossed plates $c$, $d$, whose respective widths correspond with the diameters of the two valves, they being equal to each other.

The valve, $a$, works through a cylindrical aperture made through the bottom of a small outlet chamber, E, that is connected with the pipe, C, by means of a passage, $f$, the aperture, $e$, being equal in diameter to that of the valve $a$. Above the outlet chamber and directly over the valve, $b$, is an inlet chamber, F, which is connected with the chamber, E, by a cylindrical valve opening $f'$, adapted to the valve $b$. The crossed plates, $c$, $d$, extend above the valve $b$, in order to serve as guides to it.

The chamber F, freely communicates with the float vessel, D, by means of a passage, $g$.

Were we to dispense with the inlet chamber, F, and the secondary valve, $b$, and connect the pipe, C, with the float by means of a single valve opening, $e$, and valve, $a$, the pressure of the steam, on the vessel, D, would force it so hard against its seat as to require a very large float vessel as will be apparent after the mode of operation of the apparatus has been explained, and which I shall now proceed to specify.

The vessel, D, is guided in its vertical movements by means of guides, $h$, $h$, that are made to extend down from the top plate, $k$, of the vessel, A. A shoulder, $i$, is formed on each of the guides, $h$, the offices of these shoulders being, to arrest the upward movement, of the float vessel when the valves, $a$, $b$, are closed in or on their seats.

When the apparatus is in use, the condensed water and steam flow from the pipe, B, into the vessel, A. The water passes down between the float, D, and the vessel, A, and of course lifts the float so as to close the apertures of the valves, $a$, and $b$, and force the float up against the shoulders $i$, $i$. As soon as, or soon after this has taken place, the water will rise up and flow over the top of the float vessel, D, and until the load or quantity of water deposited in the said vessel D, causes such vessel to sink downwardly and open the valves, $a$, $b$, or depress them below their respective openings, $e$, $f'$. This being the case, the pressure of the steam on the water in the vessel D, will force it through the openings, $e$, $f'$, and into the chamber, E, from whence it will be driven into and through the pipe, C. The pressure of the steam on the vessel, D, tending to close the valve, $a$, or force it toward its seat is counteracted by the downward pressure of it on the valve $b$, such downward pressure operating through the passage, $g$, and chamber, F. Consequently by means of the extra valve $b$, its opening, $f'$, and the chamber, F, made to communicate with the vessel, D, we are enabled to employ a very small vessel, D, and chest or vessel A, in comparison to what would be required without such appliances, for were the pipe, C, to have a simple valve opening at its lower end to operate in connection with a valve applied to the float D, the vessel, D, would have to be made large enough to hold sufficient weight of water to overcome the effect of the pressure of the steam before the vessel would sink in the surrounding water sufficiently to discharge water through the valve openings.

I claim—

In combination with the float, D, the outlet tube C, the valve $a$, and opening $e$, (or the mechanical equivalents of said valve, $a$, and opening, $e$,) the second valve, ($b$) and opening, $f'$, (or the mechanical equivalents for such valve, $b$, and opening $f'$,) so arranged and applied to the tube, C, and the vessel or float, D, as to operate to counteract the pressure on the other or valve, $a$, under circumstances and for the purpose substantially as hereinbefore specified.

In testimony whereof, I have hereto set my signature this fourteenth day of May, A. D. 1853.

C. C. WALWORTH.

Witnesses:
R. H. EDDY,
FRANCIS GOULD.